United States Patent [19]
Shin

[11] Patent Number: 5,440,969
[45] Date of Patent: Aug. 15, 1995

[54] CYLINDER-OPERATED AND SPRING-LOADED DRIVING MECHANISM FOR A BALL VALVE

[76] Inventor: Wan-Sheng Shin, No. 190 Jen Ai Street, San Chung City, Taipei, Taiwan

[21] Appl. No.: 207,612

[22] Filed: Mar. 9, 1994

[51] Int. Cl.⁶ .................. F01B 7/04; F01B 31/00; F16K 31/12
[52] U.S. Cl. .................. 92/68; 92/130 A; 92/130 D; 92/138; 251/58
[58] Field of Search .................. 92/68, 130 R, 130 A, 92/130 D, 138; 251/58

[56] References Cited
U.S. PATENT DOCUMENTS

| | | | |
|---|---|---|---|
| 2,650,616 | 9/1953 | Wilkinson et al. | 92/130 R X |
| 3,037,484 | 6/1962 | Dixon | 92/138 X |
| 3,131,603 | 5/1964 | Hadekel | 92/130 R X |
| 3,672,260 | 6/1972 | Gachot et al. | 92/138 X |
| 4,354,424 | 10/1982 | Nordlund | 92/130 D X |
| 4,651,626 | 3/1987 | Messina | 92/130 D X |

FOREIGN PATENT DOCUMENTS
3047283  7/1982  Germany .

*Primary Examiner*—John E. Ryznic
*Attorney, Agent, or Firm*—Bacon & Thomas

[57] ABSTRACT

The present invention relates to a cylinder-operated driving mechanism for a ball valve, and more particularly to a cylinder-operated driving mechanism for a ball valve in which a plurality of guided compression springs are loaded between the cylinder caps at two ends of the cylinder and the two horizontally opposite pistons of the cylinder such that when there is no air supplied to the cylinder for driving the closing of the ball valve, the compressed spring force stored in the guided compression springs can push the two pistons to move toward each other and thereby turn the driving shaft connected to the pistons via links and driving shaft seat and further stably and reliably drives the ball valve to turn close.

1 Claim, 4 Drawing Sheets

5,440,969

CYLINDER-OPERATED AND SPRING-LOADED DRIVING MECHANISM FOR A BALL VALVE

BACKGROUND OF THE INVENTION

The present invention relates to an improved cylinder-operated driving mechanism for a ball valve, mainly consisting of a cylinder with an air guide passage, pistons, a driving shaft seat, a driving shaft, links, and a plurality of compression springs, and being characterized by that, when the cylinder has not air supplied to it, the compression springs may, by the compressed spring force stored therein, automatically push the two horizontally opposite pistons in the cylinder to turn the driving shaft and thereby cause the ball valve connected thereto to close. That is, the ball valve can be automatically closed without the need of any externally exerted force.

The ball valve is widely applied in industrial fields, and the most ideal control manner of a ball valve is to use a cylinder-operated driving mechanism connected with the ball valve. FIG. 4 illustrates a conventional cylinder-operated driving mechanism for a ball valve, in which two air passage systems are required. One of the air passage systems mainly includes a first air supply passage inlet 14 and is used to open the ball valve; the other one mainly includes a second air supply passage inlet 15 and is used to close the ball valve. These two air supply passage systems alternately open and close to drive pistons 2 in the cylinder 1. To close the ball valve, air is discharged from a cylinder chamber 111 of the cylinder 1 via the first air supply passage inlet 14, and another air flow is supplied to the cylinder 1 via the second air supply passage inlet 15 and flows through an air passage 151 communicable with the inlet 15. The in-flow air forces the two pistons 2 in the cylinder 1 to move toward each other and thereby causes two links 4 connecting the pistons 2 to a driving shaft seat 3 on a driving shaft 5 to drive the driving shaft 5 to turn in a reverse direction. Since the driving shaft 5 connects with a control stem of the ball valve, the turning of the driving shaft 5 in the reverse direction shall cause the ball valve to close.

In such a ball valve driving mechanism with two air supply passage systems, high cost and high reliability of the equipment is required, because any unexpected stop or failure of the air supply passage system for closing the ball valve during the whole operating course will disable the entire clyinder-operated driving mechanism and the ball valve controlled by the latter shall keep open without being timely closed which will cause unimaginable result. Therefore, it is desirable to improve the conventional cylinder-operated driving mechanism for ball valves to overcome the above shortcomings and to obtain better efficiency in practical use.

SUMMARY OF THE INVENTION

It is therefore a primary object of the present invention to provide a cylinder-operated and spring-loaded driving mechanism for a ball valve in which a plurality of compression springs are disposed between the horizontally opposite pistons and the cylinder caps. When the air pressure in the cylinder is not enough to drive the pistons, the compressed spring force stored in the compression springs shall automatically push the two pistons to turn the driving shaft and thereby closes the ball valve without the need of other additional power. By this manner, the function of the cylinder to close the ball valve can be more steady and more reliable.

BRIEF DESCRIPTION OF THE DRAWINGS

The structure, features, other objects, and effects of the present invention, as well as the technical means adopted to implement the present invention can be better understood through the following detailed description of the preferred embodiment and the accompanying drawings, wherein.

DETAILED DESCRIPTION OF THE PREFERRED EMBODIMENT

Figure 1:
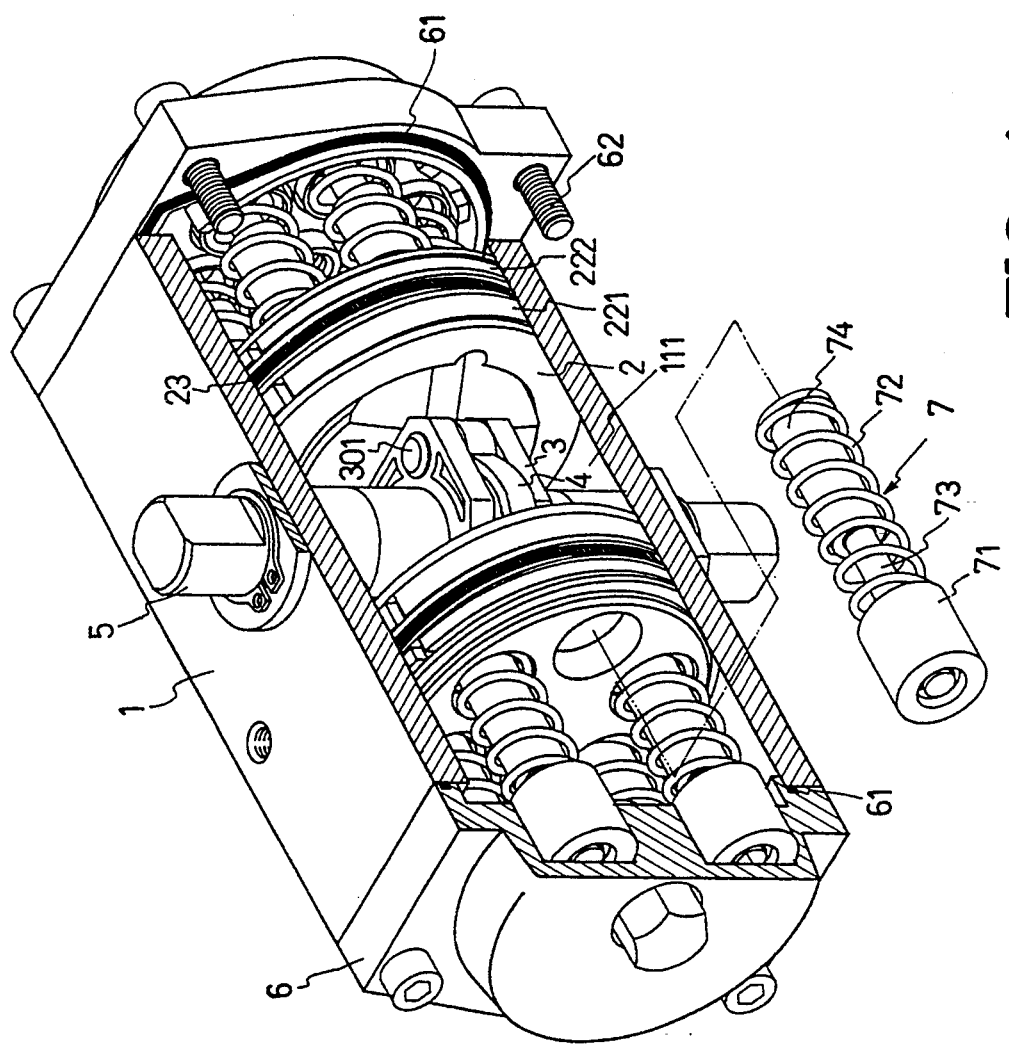
FIG. 1 is a perspective view of the present invention with part of it cut away to clearly show the inner structure thereof.
Figure 2:
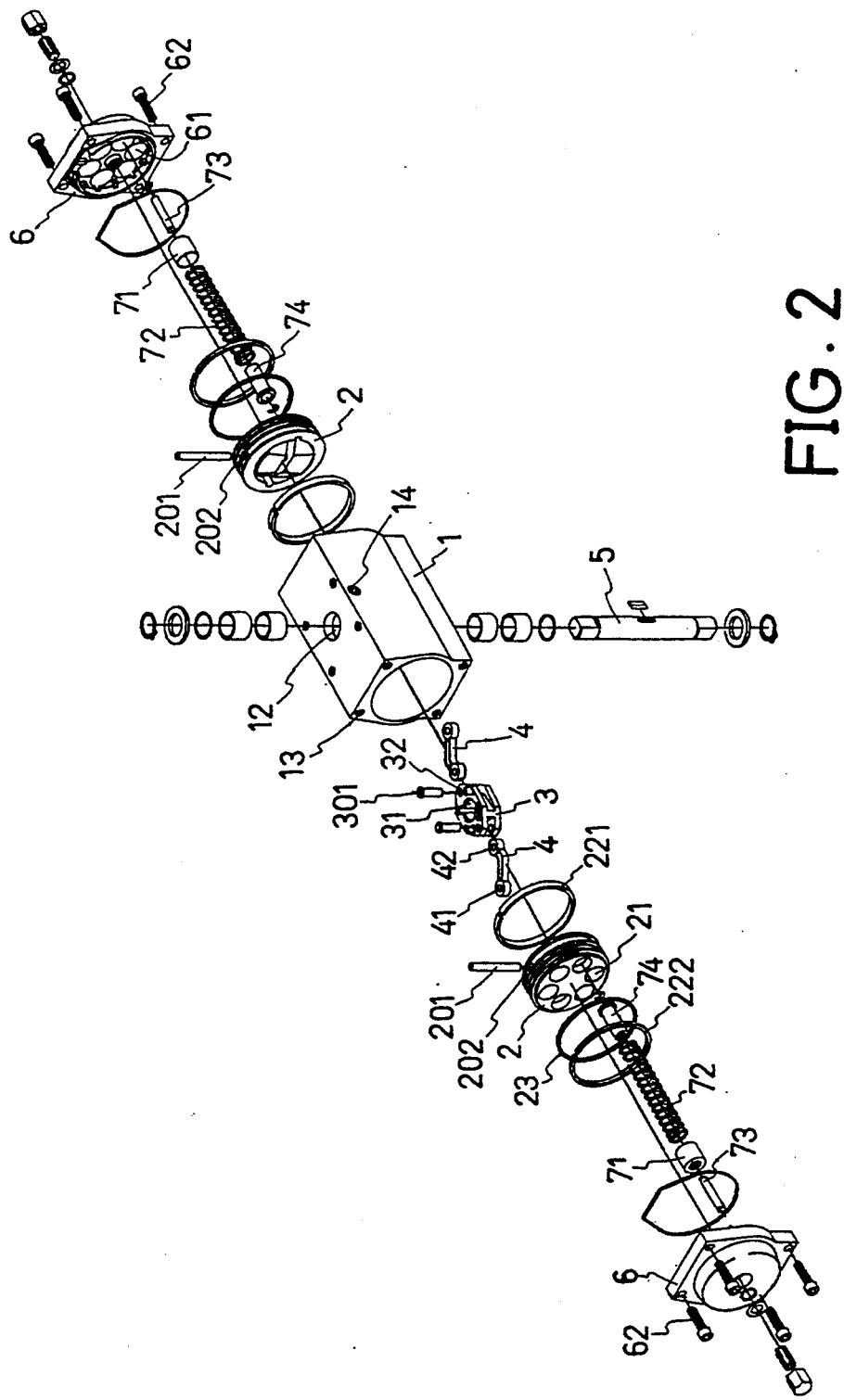
FIG. 2 is an exploded perspective of the present invention according to FIG. 1.
Figure 3A:
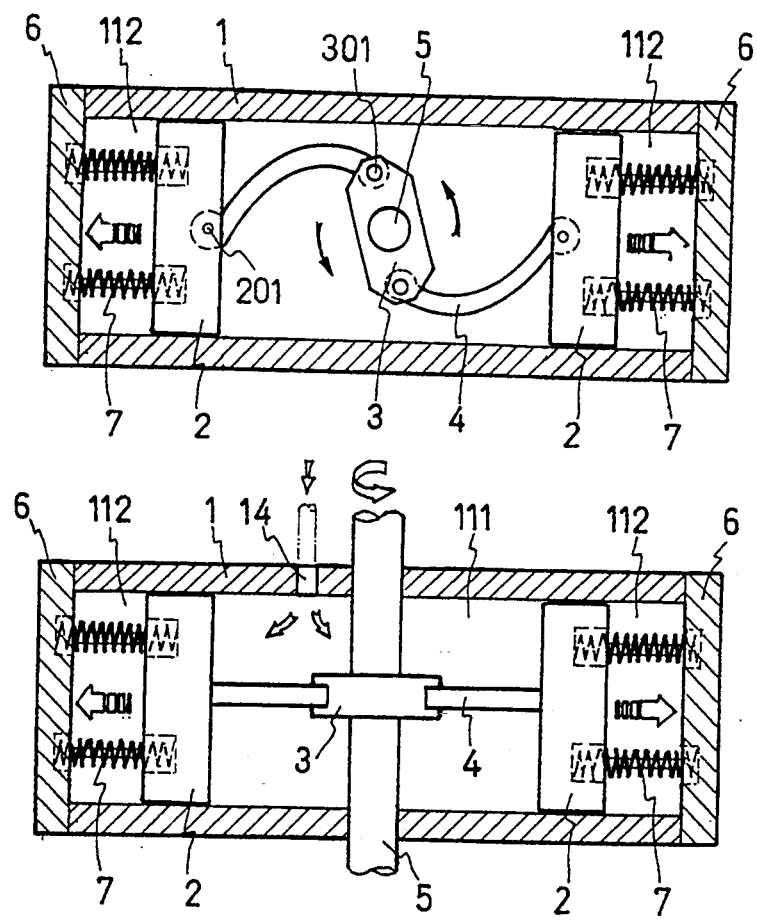
FIGS. 3(A) and 3(B) illustrates the manner in which the present invention operates.
Figure 3B:
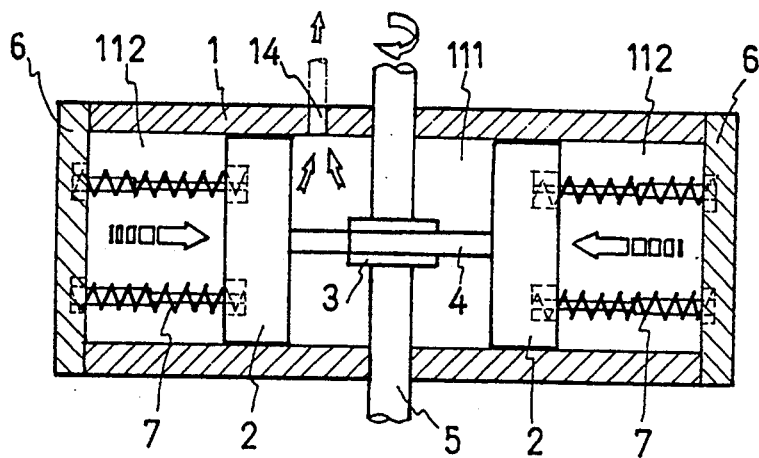
Figure 4:
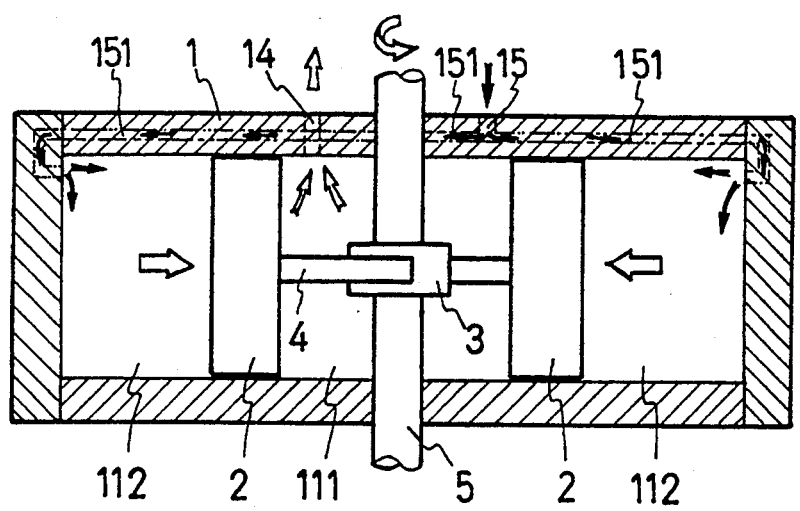
FIG. 4 illustrates the manner in which a conventional ball valve cylinder-operated driving mechanism operates.

Please refer to FIGS. 1, 2, and 3. The present invention is an improved cylinder-operated driving mechanism for a ball valve, mainly consisting of a cylinder body 1, two horizontally opposite pistons 2, a driving shaft seat 3, two links 4, a driving shaft 5, two cylinder caps 6, and a plurality of guided compression springs 7.

The cylinder body 1 has a cylinder chamber 111 in which the two pistons 2 are horizontally oppositely disposed. The pistons 2 each is circumferentially provided with two wearing proof rings 221, 222 and a seal gasket 23 between the two wearing proof rings for airtight purpose. Each of the links 4 has a first connection hole 41 at one end for connecting one of the pistons 2 by means of a piston pin 201 threading through a locating hole 202 provided on a circumferential periphery of the piston 2, and a second connection hole 42 at the other end for connecting the driving shaft seat 3 by means of a fixing pin 301 threading through a pin hole 31 provided on one end of the driving shaft seat 3. The driving shaft seat 3 has a centered driving shaft hole 31 through there the driving shaft 5 passes to couple with a control stem of the ball valve driven by the present invention. The two cylinder caps 6 are fixed to two ends of the cylinder body 1 by means of screws 62 and have, at their inner side, a plurality of first spring locating recesses 61 which correspond to the same numbers of second spring locating recesses 21 formed on an outer side of the pistons 2 for the compression springs 7 to be disposed therebetween. Each of the guided compression springs 7 consists of a larger guide sleeve 71 at one end to be received in one of the first spring locating recesses 61, a smaller guide sleeve 74 at the other end to be received in one of the second spring locating recesses 21, a guide stem 73 disposed between the larger and the smaller guide sleeves 71, 74, and a helical spring 72 being put over the guide stem 73 and the smaller guide sleeve 74 with one end pressing against the larger guide sleeve 71 and the other end against the second spring locating recess 21. With the arrangement of these elements, the guided compression springs 7 will not become deformed during the compression course and therefore reversely affect their function.

Please refer to FIG. 3 for the operation of the present invention. To open the ball valve, air is supplied to the cylinder chamber 111 from the air supply passage inlet 14 on the cylinder body 1, as shown in (A) of FIG. 3. The air entered the cylinder chamber 111 forces the horizontally opposite pistons 2 to move outward and away from each other; at this point, the links 4 and the driving shaft seat 3 connected to the links 4 are turned and thereby causes the driving shaft 5 to turn in a first or a positive direction. Since the driving shaft 5 connects to the control stem of the ball valve, the ball valve is therefore turned to open. The guided compression springs 7 disposed in two side cylinder chambers 112 between the pistons 2 and the cylinder caps 6 are at the same time compressed by the pistons 2 and a compressed spring force equal to the air pressure supplied through the air inlet 14 for open the ball valve is stored in the guided compression springs 7.

Or reversely, when the ball valve is to be closed or the air supply system is unexpectedly failed, the air in the cylinder chamber 111 is discharged from the air supply passage inlet 14, as shown in the (B) of FIG. 3, and the air pressure in the chamber 111 drops down, accordingly. At this point, the compressed spring force stored in the compressed guided compression springs 7 becomes larger than the air pressure used to open the ball valve, and therefore, the pistons 2 are pushed by the compressed spring force of the springs 7 to move inward toward each other. The links 4 and the driving shaft seat 3 connected thereto are at the same time turned in a reverse direction by the two pistons 2 and causes the driving shaft 5 to turn in a second or a negative direction which causes the ball valve to close.

According to the above arrangement, the cylinder-operated and spring-loaded driving mechanism for a ball valve according to the present invention may effectively eliminate the shortcomings existed in the conventional cylinder-operated driving mechanism of ball valve having two air supply passage systems. In additional, the present invention does not require any externally provided power to automatically close the ball valve. Such improved cylinder-operated and spring-loaded driving mechanism for ball valve is simple in the structure but provides more steady and reliable function to close a ball valve, and is therefore very practical in use.

The present invention has been described in details with particular reference to the preferred embodiments thereof, but it will be understood that variations and modifications can be made within the spirit and scope of the present invention as described hereinabove and as defined in the appended claims.

What is claimed is:

1. A cylinder-operated and spring-loaded driving mechanism for a ball valve, comprising a cylinder body, two pistons, two links, a driving shaft seat, a driving shaft, a plurality of guided compression springs, and two cylinder caps;

said cylinder body having a hollow cylinder chamber for containing other cylinder elements therein and having an air supply inlet formed at a predetermined position thereon to connect with an air supply system;

said two pistons being oppositely disposed in said cylinder chamber and being connected to each other by means of said two links and said driving shaft seat; said pistons having in their inner side a plurality of second spring locating recesses to receive one end of said guided compression springs;

said driving shaft seat having a centered driving shaft hole for said driving shaft to pass through and being connected at two ends thereof to said two links and accordingly, said pistons;

said driving shaft passing through said driving shaft seat and extending out of said cylinder body to connect a control stem of a ball valve so as to transmit control movements produced by said driving mechanism to said ball valve;

said cylinder caps being sealed to two ends of said cylinder body and having a plurality of first spring locating recesses formed at their inner side, the numbers and positions of said first spring locating recesses being corresponding to those of said second spring locating recesses on said pistons; and said guided compression springs being separately disposed between said cylinder caps and said pistons with their two ends separately received in said first and said second spring locating recesses; said guided compression springs each consisting of a helical spring which is put over a guide stem disposed between two guide sleeves and therefore is prevented from deformation due to compression; and compressed spring force stored in said compression springs when they are compressed being a power for pushing said pistons to move toward each other to close said ball valve when said air supply system connected to said air inlet is failed;

said cylinder-operated and spring-loaded driving mechanism for a ball valve being characterized in that when air is supplied to said cylinder chamber from said air inlet on said cylinder body, said two pistons are forced to move outward away from each other and thereby driving said links connected to said pistons, said driving shaft seat connected to said links, and said driving shaft passing through said driving shaft seat to turn in a first direction that causes said ball valve connected with said driving mechanism through said control stem to turn to open; that said guided compression springs are compressed between said pistons and said cylinder caps while said pistons are pushed by the air to move outward and store compressed spring force equal to the air pressure of said air supplied from said air inlet to control the opening of said ball valve; and that when said ball valve is to be closed or when said air supply system is failed, said air in said cylinder chamber is discharged from said air inlet and the air pressure in said cylinder chamber drops down, accordingly, to become lower than said compressed spring force stored in the compressed guided compression springs, and therefore, causes said pistons to be pushed inward toward each other by said guided compression springs, and said links, said driving shaft seat, and said driving shaft are turned in a reverse second direction to drive said ball valve to turn and close.

* * * * *